US012489991B2

(12) United States Patent
Mo et al.

(10) Patent No.: US 12,489,991 B2
(45) Date of Patent: Dec. 2, 2025

(54) IMAGING DEVICE, PIXEL AND MANUFACTURING METHOD THEREOF

(71) Applicant: Smartsens Technology (HK) CO., LIMITED, Kowloon (HK)

(72) Inventors: Yaowu Mo, Shanghai (CN); Zhibin Xiong, Shanghai (CN); Chen Xu, Shanghai (CN); Zexu Shao, Shanghai (CN)

(73) Assignee: SMARTSENS TECHNOLOGY (HK) CO., LIMITED, Hong Kong (HK)

( * ) Notice: Subject to any disclaimer, the term of this patent is extended or adjusted under 35 U.S.C. 154(b) by 0 days.

(21) Appl. No.: 18/345,465

(22) Filed: Jun. 30, 2023

(65) Prior Publication Data

US 2023/0345141 A1    Oct. 26, 2023

Related U.S. Application Data

(62) Division of application No. 15/662,169, filed on Jul. 27, 2017, now abandoned.

(51) Int. Cl.
| | |
|---|---|
| H04N 25/44 | (2023.01) |
| H04N 25/13 | (2023.01) |
| H04N 25/42 | (2023.01) |
| H04N 25/46 | (2023.01) |
| H04N 25/531 | (2023.01) |

(Continued)

(52) U.S. Cl.
CPC .............. *H04N 25/44* (2023.01); *H04N 25/13* (2023.01); *H04N 25/42* (2023.01); *H04N 25/46* (2023.01); *H04N 25/531* (2023.01); *H04N 25/771* (2023.01); *H04N 25/778* (2023.01); *H04N 25/78* (2023.01); *H10F 39/199* (2025.01); *H10F 39/8033* (2025.01); *H10F 39/813* (2025.01); *H10F 39/014* (2025.01);

(Continued)

(58) Field of Classification Search
CPC .......... H01L 27/14603; H01L 27/1461; H01L 27/14636; H01L 27/1464; H01L 27/14641; H01L 27/14645; H01L 27/14689; H04N 25/13; H04N 25/42; H04N 25/44; H04N 25/46; H04N 25/531; H04N 25/532; H04N 25/616; H04N 25/75; H04N 25/77; H04N 25/771; H04N 25/778; H04N 25/78; H10F 39/014; H10F 39/182; H10F 39/199; H10F 39/802; H10F 39/8033; H10F 39/811; H10F 39/813

See application file for complete search history.

(56) References Cited

U.S. PATENT DOCUMENTS

| | | | |
|---|---|---|---|
| 2008/0007640 A1* | 1/2008 | Fuchikami | H04N 3/1512 348/E3.018 |
| 2013/0107093 A1* | 5/2013 | Aoki | H04N 25/75 348/E5.091 |

(Continued)

*Primary Examiner* — Antoinette T Spinks
(74) *Attorney, Agent, or Firm* — Armstrong Teasdale LLP

(57) ABSTRACT

The present disclosure relates to an imaging device, a pixel and a method thereof. The imaging device comprises: a pixel array, which comprises multiple pixels arranged in rows and columns, wherein at least one pixel comprises multiple subpixels, and the multiple subpixels share one floating diffusion region; and a control circuit, which controls the pixel array; wherein the control circuit reads the multiple subpixels one by one under the rolling shutter state, and reads the multiple subpixels simultaneously under the global shutter state.

7 Claims, 12 Drawing Sheets

(51) Int. Cl.
    *H04N 25/771*      (2023.01)
    *H04N 25/778*      (2023.01)
    *H04N 25/78*       (2023.01)
    *H10F 39/00*       (2025.01)
    *H10F 39/12*       (2025.01)
    *H10F 39/18*       (2025.01)

(52) U.S. Cl.
    CPC .......... *H10F 39/182* (2025.01); *H10F 39/802* (2025.01); *H10F 39/811* (2025.01)

(56) References Cited

U.S. PATENT DOCUMENTS

| | | | | |
|---|---|---|---|---|
| 2015/0055002 | A1* | 2/2015 | Beck | H04N 25/59 |
| | | | | 348/308 |
| 2015/0333099 | A1* | 11/2015 | Lyu | H01L 27/14641 |
| | | | | 257/432 |
| 2018/0063459 | A1* | 3/2018 | Stark | H04N 25/76 |
| 2019/0037154 | A1* | 1/2019 | Mo | H04N 25/75 |

* cited by examiner

IMAGING DEVICE, PIXEL AND MANUFACTURING METHOD THEREOF

CROSS-REFERENCE TO RELATED APPLICATION

This application is a divisional application of and claims priority to U.S. patent application Ser. No. 15/662,169, filed Jul. 27, 2017, the disclosure of which is hereby incorporated by reference herein in its entirety.

TECHNICAL FIELD

The present disclosure relates to the imaging technical field, and more particularly, to an imaging device, a pixel, and a method of manufacturing the pixel.

BACKGROUND

CMOS image sensors have been widely used in many products, including mobile phones, tablets, cars, monitoring systems, and so on. With pixel concentration becomes increasingly higher, image resolution is no longer the most important issue in this field. More attention is paid to imaging performance in other aspects. Especially, obtaining high quality image without the aid of hardware with complex structure now has been a tendency of research and development in the imaging technical field, for example, obtaining high quality image with a portable imaging device, such as a card camera.

SUMMARY

With respect to the problem in prior art, according to one aspect of this invention, an imaging device is provided. This imaging device comprises: a pixel array, which comprises a plurality of pixels arranged in rows and columns, wherein at least one pixel comprises a plurality of subpixels, and a plurality of subpixels share one floating diffusion region; and a control circuit, which controls the pixel array; wherein the control circuit reads a plurality of subpixels one by one under the rolling shutter state, and reads a plurality of subpixels simultaneously under the global shutter state.

The imaging device as above, wherein a plurality of subpixels have the same color.

The imaging device as above, wherein each of a plurality of subpixels is controlled by an independent transfer signal.

The imaging device as above, further comprising a first capacitor, which is used to connect to the floating diffusion region to store a photosensitive signal under the global shutter state; and a second capacitor, which is used to connect to the floating diffusion region to store a reset signal under the global shutter state.

The imaging device as above, further comprising an output transistor controlled by a bias voltage signal, wherein the output transistor is connected to a column output line under the rolling shutter state and is grounded under the global shutter state.

The imaging device as above, wherein the output transistor is controlled by a bias voltage signal, wherein the bias signal functions as a selection signal under the rolling state, and under the global state, the bias signal controls the off and on states of the output transistor.

The imaging device as above, wherein at least one subpixel of a plurality of subpixels comprises a sensing layer, an intra-pixel interconnection layer, and a circuit layer.

The imaging device as above, wherein the sensing layer comprises a photodiode, a transfer gate, and a floating diffusion region; the circuit layer comprises a reset gate, a source following gate, a row selection gate, a first capacitor, and a second capacitor; the floating diffusion region is electrically connected to the reset gate and the source following gate by the electrical channel of the intra-pixel interconnection layer.

The imaging device as above, wherein the sensing layer comprises a photodiode, a transfer gate, a floating diffusion region, a reset gate, and a source following gate; the circuit layer comprises a row selection gate, a first capacitor, and a second capacitor; the source following gate is electrically connected to the first capacitor and the second capacitor by the electrical channel of the intra-pixel interconnection layer.

According to another aspect of the present disclosure, a pixel is provided. The pixel comprises a plurality of subpixels, and each subpixel comprises: a sensing chip, which comprises a photodiode and a transfer transistor; a logic chip, which is under the sensing chip, and an electrical connection channel, which connects the sensing chip and the logic chip; wherein a plurality of photodiodes of a plurality of subpixels are read one by one under the rolling shutter state, and a plurality of photodiodes of a plurality of subpixels are read simultaneously under the global shutter state.

The pixel as above, wherein a plurality of subpixels share one floating diffusion region.

The pixel as above, wherein a plurality of subpixels have the same color.

The pixel as above, wherein each of a plurality of subpixels is controlled by an independent transfer signal.

The pixel as above, further comprising a first capacitor, which is used to connect to the floating diffusion region to store a photosensitive signal under the global shutter state; and a second capacitor, which is used to connect to the floating diffusion region to store a reset signal under the global shutter state.

The pixel as above, further comprising an output transistor controlled by a bias voltage signal, wherein the output transistor is connected to a column output line under the rolling shutter state and is grounded under the global shutter state.

The pixel as above, wherein the output transistor is controlled by a bias voltage signal, wherein the bias signal functions as a selection signal under the rolling state, and under the global state, the bias signal controls the off and on states of the output transistor.

The pixel as above, wherein the sensing chip comprises a floating diffusion region, the logic chip comprises a reset transistor, a source following transistor, a row selection transistor, a first capacitor, and a second capacitor; the floating diffusion region is electrically connected to the reset transistor and the source following transistor by the electrical connection channel.

The pixel as above, wherein the sensing chip comprises a floating diffusion region, a reset transistor, and a source following transistor, the logic chip comprises a row selection transistor, a first capacitor, and a second capacitor; the source following transistor is electrically connected to the first capacitor and the second capacitor by the electrical connection channel.

According to yet another aspect of present disclosure, a method of operating an imaging device, comprising: in response to the rolling shutter state, reading a plurality of subpixels in turn, wherein the plurality of subpixels share a floating diffusion region; and in response to the global shutter state, reading the plurality of subpixels simultaneously.

The method of the above, wherein the plurality of subpixels have the same color.

The method of the above, wherein each of the plurality of subpixels is controlled by an independent transfer signal.

The method of the above, wherein the plurality of subpixels belong to a pixel.

According to yet another aspect of the present disclosure, a pixel manufacturing method is provided. This method comprises: planting P-type or N-type particle in a substrate to form a plurality of active regions and to form a plurality of first circuit regions with respect to each active region; depositing a first spacer layer; etching a plurality of channels in the spacer layer, which are respectively connected to a plurality of first circuit regions; depositing metal in the channels to form a plurality of conducting channels; forming a plurality of transfer gates on a first spacer layer; forming a plurality of photodiodes and a plurality of floating diffusion regions on the spacer layers, which are respectively connected to a plurality of transfer gates; and forming a second spacer layer on a plurality of transfer gate, a plurality of photodiodes, and a plurality of floating diffusion regions.

The method as above, wherein a plurality of floating diffusion regions are electrically connected to a plurality of conducting channels.

The method as above, wherein the first circuit region comprises a reset transistor, a source following transistor, a row selection transistor, a first capacitor, and a second capacitor.

The method as above, further comprising: forming a plurality of second circuit regions while forming a plurality of photodiodes and a plurality of floating diffusion regions; wherein a plurality of second circuit regions are electrically connected to a plurality of conducting channels.

The method as above, wherein the first circuit region comprises a row selection transistor, a first capacitor, and a second capacitor; the second circuit region comprises a reset transistor and a source following transistor.

BRIEF DESCRIPTION OF THE DRAWINGS

Next, preferred embodiments of the present disclosure will be described in detail in conjunction with the accompanying drawings, wherein.

DETAILED DESCRIPTION

In order to clarify the objective of the present disclosure, technical measures and advantages, the technical solutions of embodiments will be described clearly and completely below in conjunction with the appended drawings. Obviously, the described embodiments are only a part of those of the present disclosure, rather than all of them. Based on the embodiments of the present disclosure, all the other embodiments obtained by those skilled in the art without inventive effort are still within the scope of the present disclosure.

The following detail description can be referred to with the appended drawings, which are also a part of the present disclosure illustrating the specific embodiments. In the appended drawings, similar reference signs in different drawings describe generally similar components. Some specific embodiments of the present disclosure are described in detail as follows such that ordinary persons with related knowledge and technology in the art can carry out the technical solutions of this disclosure. Other embodiments can also be utilized as alteration of structure, logic, or electrical property can be made to the embodiments of the present disclosure.

Figure 1:
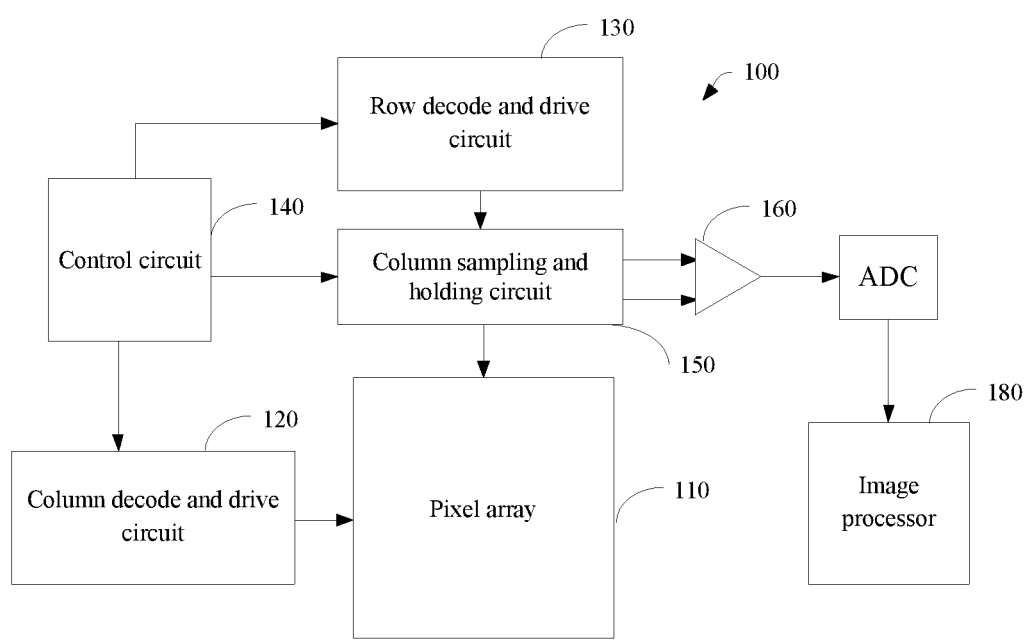
FIG. 1 illustrates a schematic diagram of the structure of an imaging device.
Figure 2:
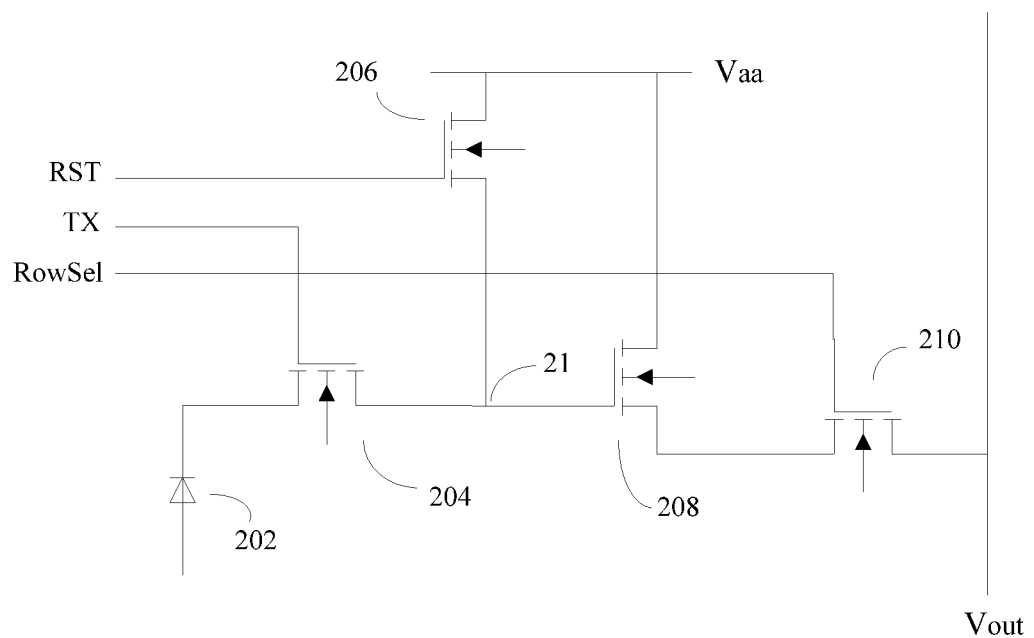
FIG. 2 illustrates a schematic diagram of a representative pixel structure.

The terminology "pixel" may refer to an electronic element comprising a photosensitive device or the like to convert electromagnetic signal into electrical signal. For illustrative purposes, FIG. 1 shows a representative imaging device, which comprises a pixel array. FIG. 2 illustrates a representative pixel and all the pixels in the pixel array usually will be manufactured in a similar way.

FIG. 1 illustrates a schematic diagram of the structure of an imaging device. An imaging device 100, such as a CMOS imaging device, comprises a pixel array 110 having multiple pixels arranged in rows and columns. In the pixel array 110, all pixels of each column are powered on simultaneously by a column selection line, and pixels of each row are output selectively by a row selection line respectively. Each pixel has a row address and a column address. The column address of a pixel corresponds to the row selection line driven by a column decode and drive circuit 120, and the row address of a pixel corresponds to the row selection line driven by a row decode and drive circuit 130. A control circuit 140 controls the column decode and drive circuit 120 and the row decode and drive circuit 130 to selectively read a pixel output signal corresponding to a suitable row and a suitable column in the pixel array.

The pixel output signals comprise a pixel reset signal $V_{rst}$ and a pixel image signal $V_{sig}$. The pixel reset signal $V_{rst}$ represents, when resetting the floating diffusion region of a photosensitive device (e.g., a photodiode), the signal obtained from the floating diffusion region. The pixel image signal $V_{sig}$ represents the signal obtained after charges representing the image and acquired by the photosensitive device transfer to the floating diffusion region. Both the pixel reset signal $V_{rst}$ and the pixel image signal $V_{sig}$ are read by a column sample and hold circuit 150 and are subtracted by a differential amplifier 160. The signal $V_{rst}$-$V_{sig}$ output by the differential amplifier 160 represents the image signal acquired by the photosensitive device. The image signal is converted into a digital signal by an analog to digital converter (ADC) 170, and then is further processed by an image processor 180 to output a digital image.

FIG. 2 illustrates a schematic diagram of a representative pixel structure. A pixel 200 in FIG. 2 comprises a photodiode 202, a transfer transistor 204, a reset transistor 206, a source following transistor 208, and a row selection transistor 210. The photodiode 202 is connected to the source of the transfer transistor 204. The transfer transistor 204 is controlled by the signal TX. When the signal TX controls the transfer transistor 204 in the "on" state, charges accumulated in the photodiode is transferred to a storage region 21. Meanwhile, the photodiode 202 is reset. The gate of the source following transistor 208 is connected to the storage region 21. The source following transistor 208 amplifies the signal received from the storage region 21. The source of the reset transistor 206 is also connected to the storage region 21. The reset transistor 206 is controlled by the signal RST to reset the storage region 21. The row selection transistor 210 is controlled by the signal RowSel to output the signal amplified by the source following transistor 208 to an output line $V_{out}$.

Figure 3:
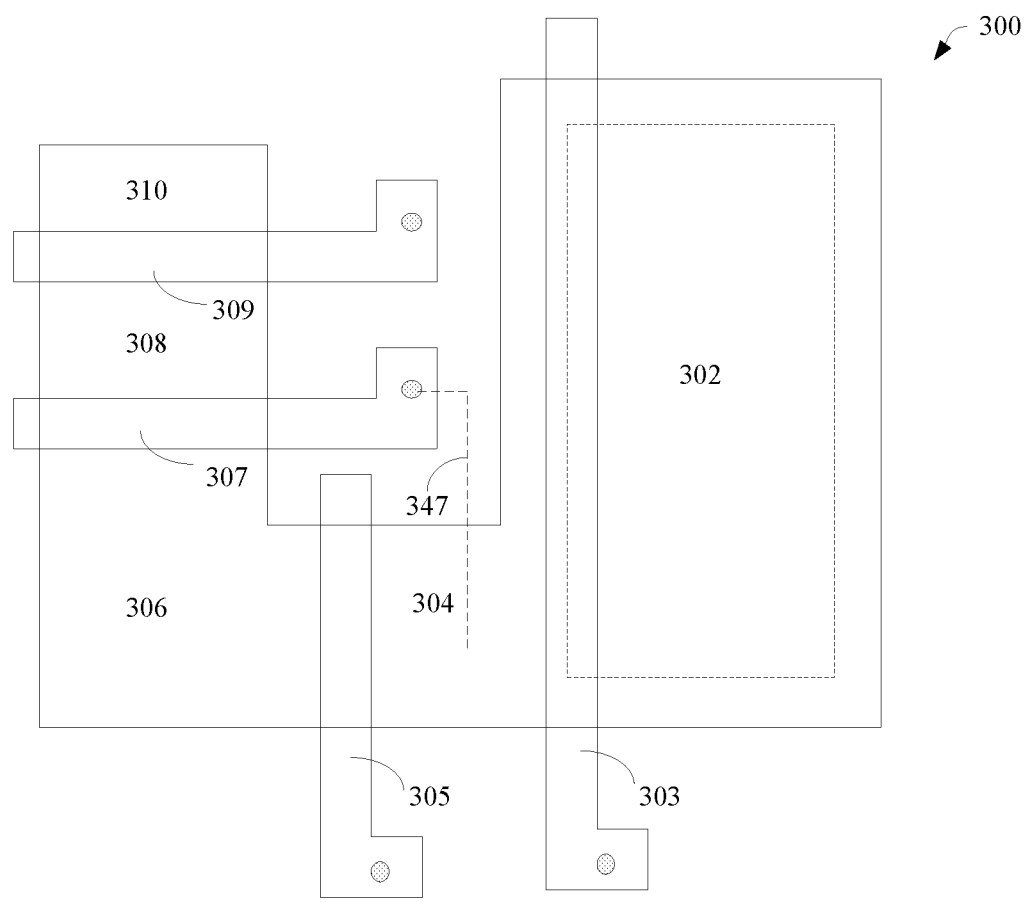
FIG. 3 illustrates a schematic diagram of a representative pixel structure.

FIG. 3 also illustrates a schematic diagram of a representative pixel structure. FIG. 3 is a specific semiconductor structure diagram, rather than a diagram of an abstract circuit logic relationship. A pixel 300 in FIG. 3 comprises a photodiode 302 as a photosensitive device. The pixel 300 comprises a transfer gate 303, together with the photodiode 302 and the storage region, also referred to as a floating diffusion region 304, to form a transfer transistor. The pixel 300 also comprises a reset gate 305 which is connected between the floating diffusion region 304 and an active region 306 to reset the floating diffusion region 304. The active region 306 is connected to an electrode source $V_{aa}$. The pixel 300 also comprises a source following gate 307, which is connected between the active regions 306 and 308 to form a source following transistor. Furthermore, the source following gate 307 is electrically coupled to the floating diffusion region 304 by an electrical connection 347. The pixel 300 further comprises a row selection transistor gate 309, which is connected between the active region 308 and the active region 310 as the output of the pixel to form a row selection transistor.

The above transistor's source region/drain region, floating diffusion region, channel region next to a gate and between the source and the drain regions, and the photodiode are referred to as the active regions because of doping. These active regions in combination with the gate structures are referred to as active electronic devices.

The present disclosure proposes a novel CMOS pixel structure, which partitions a single pixel into a plurality of subpixels. Those subpixels can not only sense light simultaneously and then be read respectively by times so as to increase the resolution of an imaging device, but also sense light and be read simultaneously as one pixel by working cooperatively so as to adapt to shoot high-speed objects.

Figure 4:
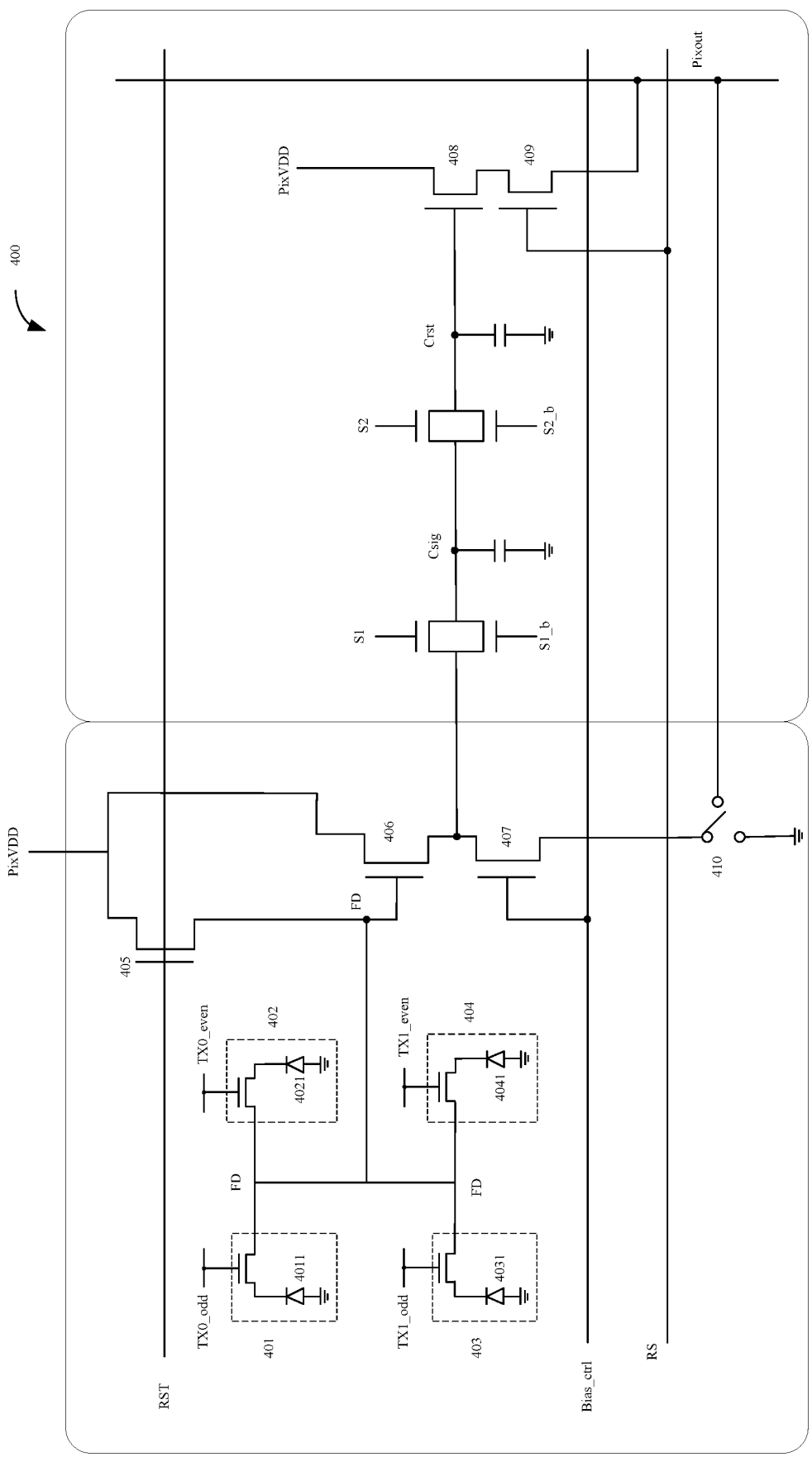
FIG. 4 illustrates a schematic diagram of a pixel structure according to one embodiment of the present disclosure.

FIG. 4 illustrates a schematic diagram of a pixel structure according to one embodiment of the present disclosure. As illustrated, a pixel 400 comprises four subpixels 401-404. Each of them comprises a photosensitive device and a transfer transistor (referring as photosensitive devices 4011-4041 and transfer transistors 4012-4042). Each photosensitive device is controlled by an independent signal TX (referring as TX0_odd, TX0_even, TX_1 odd, and TX_1 even). All the subpixels share a floating diffusion region FD. Similar to the structure of FIG. 2, the floating diffusion region FD is connected to a reset transistor 403 and a source following transistor 406.

Further, the pixel 400 comprises an output transistor 407, which is controlled by a bias voltage signal Bias_ctrl. When using the globe shutter, the output transistor 407 can be disconnected or grounded to make sure the read signal is accurate. As illustrated in the right part of FIG. 4, the pixel 400 further comprises an output source following transistor 408 and a row selection transistor 409, which form an output circuit to provide an output signal. Capacitors $C_{sig}$ and $C_{rst}$ and corresponding switches S1 and S2 are connected between the source following transistor 406 and the output source following transistor 408.

As an option, the pixel 400 comprises a switch 410, which cam switch the output transistor 407 between the grounded state and a column output line Pixout. It will be appreciated by those skilled in the art that the pixel 400 may not comprise the switch 410, but connects the output transistor 407 with the column output line Pixout. Alternatively, the function of the switch 410 can be implemented by circuits outside the pixel 400.

Figure 5:
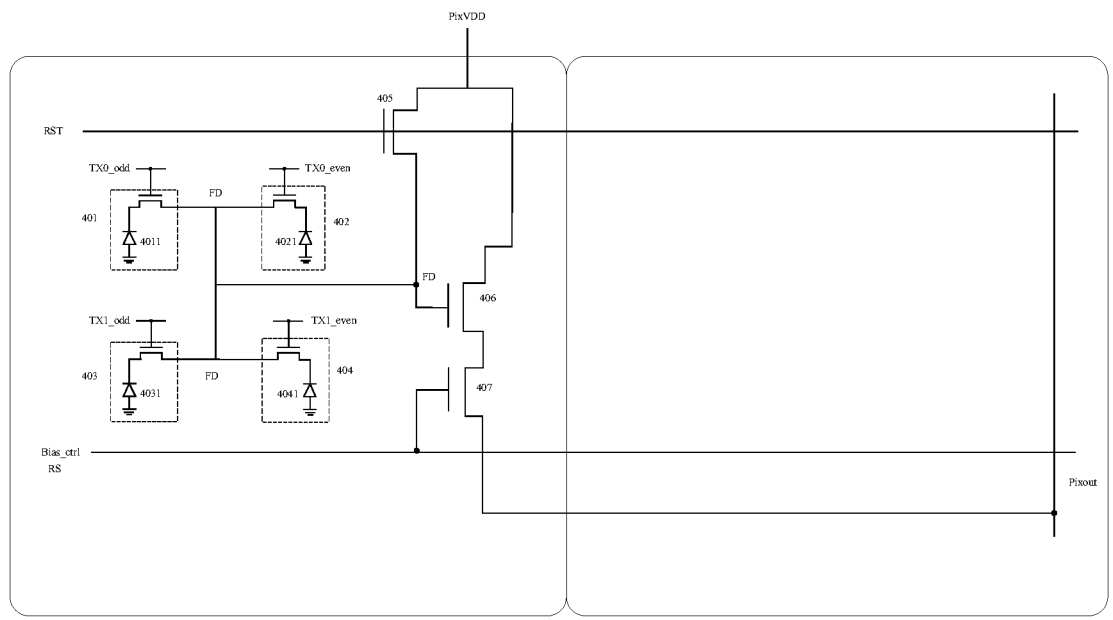
FIG. 5 illustrates an equivalent circuit schematic diagram of the embodiment in FIG. 4 under the rolling shutter state.
Figure 6:
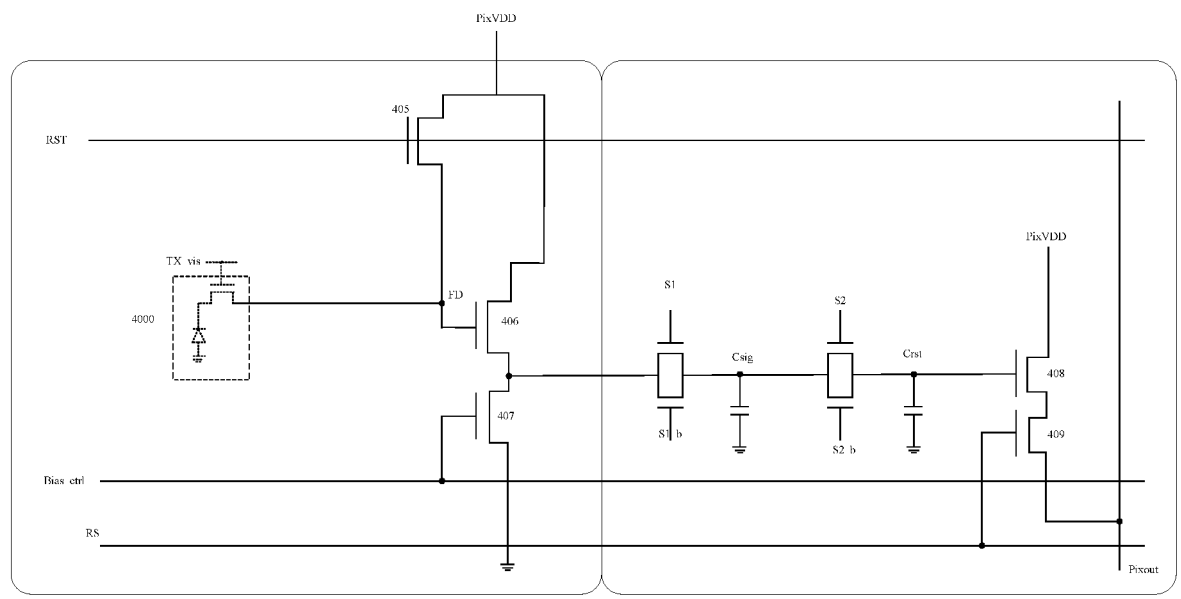
FIG. 6 illustrates an equivalent circuit schematic diagram of the embodiment in FIG. 4 under the global shutter state.

FIG. 5 illustrates an equivalent circuit schematic diagram of the embodiment in FIG. 4 under the rolling shutter state. FIG. 6 illustrates an equivalent circuit schematic diagram of the embodiment in FIG. 4 under the global shutter state. The working manner of the pixel can be better understood by referring to FIG. 5 and FIG. 6.

As illustrated in FIG. 5, under the rolling shutter state, four subpixels 401-404 are controlled to be read by a read circuit respectively. Under this state, the output transistor 407 can be controlled as a row selection transistor, and the bias voltage signal is used as a row selection signal. The switch 410 controls the output transistor 407 to connect to the column output line Pixout. Specifically, the reset transistor 405 resets the floating diffusion region FD and then a reset signal is read. TX_odd is controlled so that charges of the photosensitive device 4011 in the subpixel 401 are transferred to the floating diffusion region FD, and then the photosensitive signal of the subpixel 401 is read. A correlated double sampling is made to the photosensitive signal and the reset signal of the subpixel 401 so as to obtain the image signal detected by the subpixel 401. Similarly, the read circuit reads the image signals detected by the other subpixels 402-404 in turn. As such, four image signals are obtained from the pixel 400, which increases the resolution of the imaging device by 4 times.

As illustrated in FIG. 6, under the global shutter state, four subpixels 401-404 are controlled to be read by the read circuit simultaneously. Under this state, the output transistor 407 can be controlled by the bias voltage signal to be grounded. Specifically, the switch S1 first is closed but the capacitor $C_{sig}$ is disconnected and thereby absent in the circuit. The switch S2 is closed to put the capacitor $C_{rst}$ in the circuit. The reset transistor 405 resets the floating diffusion region FD, and then a reset signal is read and stored in the capacitor $C_{rst}$. Next, the switch S1 is closed and puts the capacitor $C_{sig}$ in the circuit. The switch S2 is closed but the capacitor $C_{rst}$ is controlled disconnected and thereby absent in the circuit. TX0_odd, TX0_even, TX_1 odd, and TX_1 even are controlled simultaneously and the charges of the photosensitive devices 4011-4041 in the subpixel 401-404 are transferred to the floating diffusion region FD at the same time, and then are stored in the capacitor $C_{sig}$. Signals in the capacitors $C_{rst}$ and $C_{sig}$ are read respectively and undergone correlated double sampling to obtain the image signal detected by the pixel 400. As such, the pixel 400 is equivalent to a virtual pixel 4000 controlled by a virtual signal TX_vis. Because the image signal of the virtual pixel 4000 is read under the control of a virtual signal TX_vis, the image signal detected by a pixel 4000 will eliminate the tailing phenomenon, even for a high-speed object.

Photosensitive devices, such as a photodiode, a photoswitch, etc., have different capabilities of receiving light. The capability difference, when reflected in imaging devices, make imaging devices to have different optical dynamic ranges, i.e., spectrum ranges that can be sensed by imaging devices. When the optical dynamic range of an imaging device is smaller than the change of external light intensity, an external scene cannot be reflected in the captured image completely. The pixel of the present disclosure can be used to increase the dynamic range of an imaging device. For example, shortening the exposure time can obtain the imaging information with higher light intensity, but will lose the imaging information with lower light intensity. Under this situation, the pixel of the present disclosure can be controlled to work in the global shutter state. Image information with lower light intensity can be superimposed so as to be detected by the circuit. As a result, the dynamic range of an imaging device is increased. Elongating the exposure time can obtain the imaging information of lower light intensity, but will lose the imaging information with low light intensity. Under this situation, the pixel of the present disclosure can be controlled to work in a rolling shutter state. Image information with high light intensity can be detected by independent subpixels.

Because it is designed to have multiple subpixels sharing a floating diffusion region and introduce an extra transfer transistor in the present disclosure, the area of photosensitive part of the pixel 400 might be reduced. In order to deal with this change, the present disclosure proposes a stereoscopically piled pixel structure in a preferred embodiment.

Figure 7:
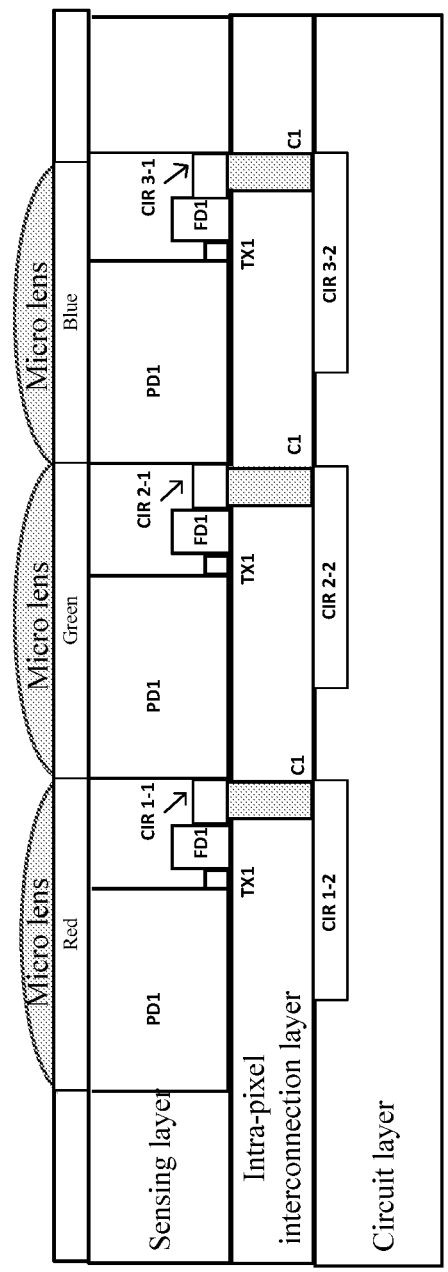
FIG. 7 illustrates a subpixel structure schematic diagram according to one embodiment of the present disclosure.

FIG. 7 illustrates a subpixel structure schematic diagram according to one embodiment of the present disclosure. As illustrated in FIG. 7 and referring to FIG. 3, under a three-color micro lens, a subpixel comprises a sensing layer, an intra-pixel interconnection layer, and a circuit layer. The sensing layer comprises a photodiode region PD1 for detecting red light, a transfer gate TX1 connected to PD1, a floating diffusion region FD1 connected to TX1, and a circuit region CIR1-1, wherein the circuit region CIR1-1 comprises a corresponding reset gate Reset and a corresponding source following gate SF. Optionally, the circuit region CIR1-1 may comprise a corresponding output gate OP. Likewise, the subpixel comprises a photodiode region PD2 for detecting green light, a transfer gate TX2 connected to PD2, a floating diffusion region FD2 connected to TX2, and a circuit region CIR2-1, wherein the circuit region CIR2-1 comprises a corresponding reset gate and a corresponding source following gate. Optionally, the circuit region CIR2-1 may comprise a corresponding output gate. The subpixel comprises a photodiode region PD3 for detecting blue light, a transfer gate TX3 connected to PD3, a floating diffusion region FD3 connected to TX3, and a circuit region CIR3-1, wherein the circuit region CIR3-1 comprises a corresponding reset gate and a corresponding source following gate. Optionally, the circuit region CIR3-1 may comprise a corresponding output gate. The intra-pixel interconnection layer comprises three electrically connected channels, i.e., channels C1, C2, and C3 illustrated in the gray part of this figure and electrically connected to FD1, FD2, and FD3 respectively. With respect to each photodiode, the circuit layer comprises corresponding circuit regions CIR1-2, CIR2-2, and CIR3-2. The circuit regions CIR1-2, CIR2-2, and CIR3-2 respectively comprise corresponding switches S1 and S2, capacitors Csig and Crst, and an output source following gate and a row selection gate.

Referring to FIG. 4, the circuit of pixel 400 in the diagram of FIG. 4 is divided into a left part and a right part. The left part is a sensing chip, and the right part is a logic chip. The sensing chip may correspond to the electronic elements included in the sensing layer of FIG. 7, and the logic chip may correspond to the electronic elements included in the circuit layer of FIG. 7. As such, FIG. 7 discloses a stereoscopically piled chip structure: the sensing chip is piled on the logic chip and they are electrically connected by an intra-pixel electrical channel between them.

Figure 8:
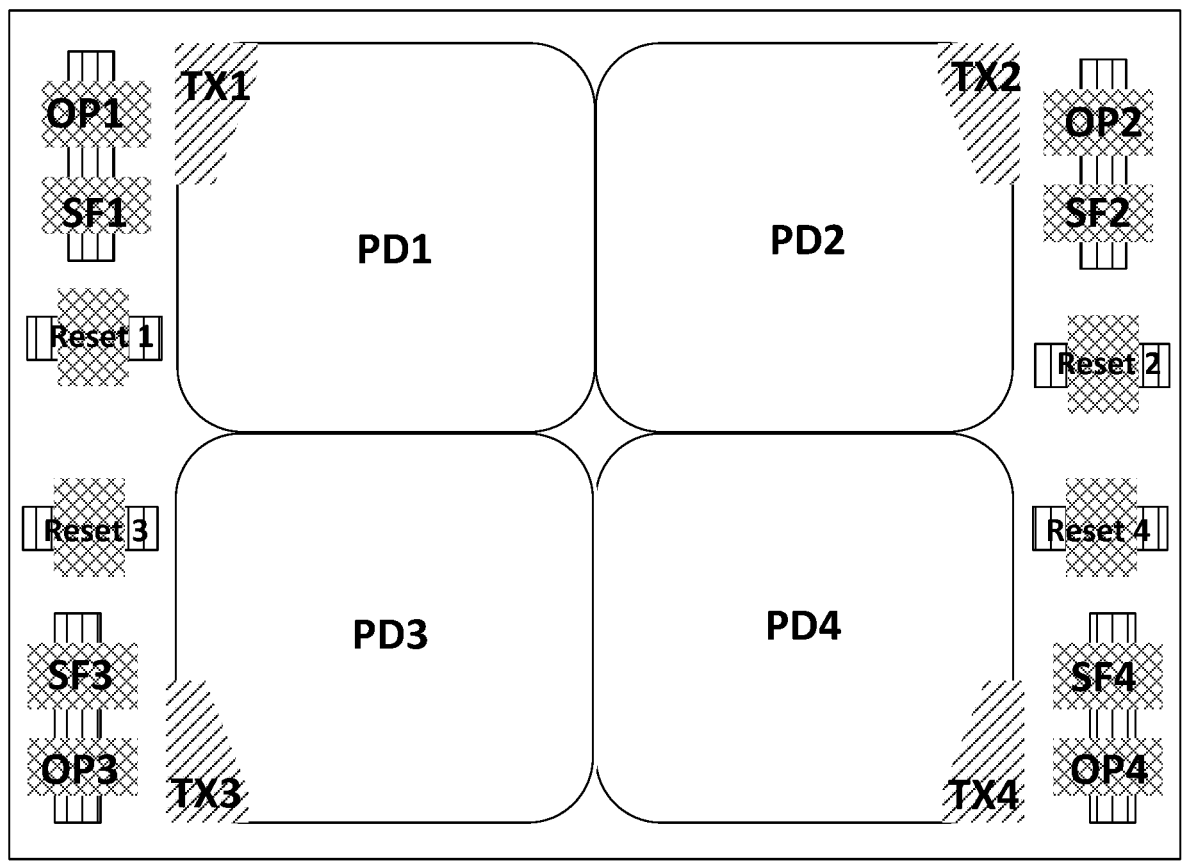
FIG. 8 is a top view of the pixel schematic diagram illustrated in the embodiment of FIG. 7.

FIG. 8 is a top view of the pixel schematic diagram illustrated in the embodiment of FIG. 7. As illustrated in FIG. 8, although the pixel in this invention introduces multiple subpixels to increase the resolution in the rolling shutter state and supports to shoot a high-speed object under the global shutter state to improve the imaging performance of an imaging device significantly, by adopting the stereoscopically piled structure of a sensing chip and a logic chip, the photosensitive area is not reduced. The photosensitive capability is not sacrificed while improving the performance of an imaging device, although the manufacture procedure is more complex than those of old ways.

Figure 9:
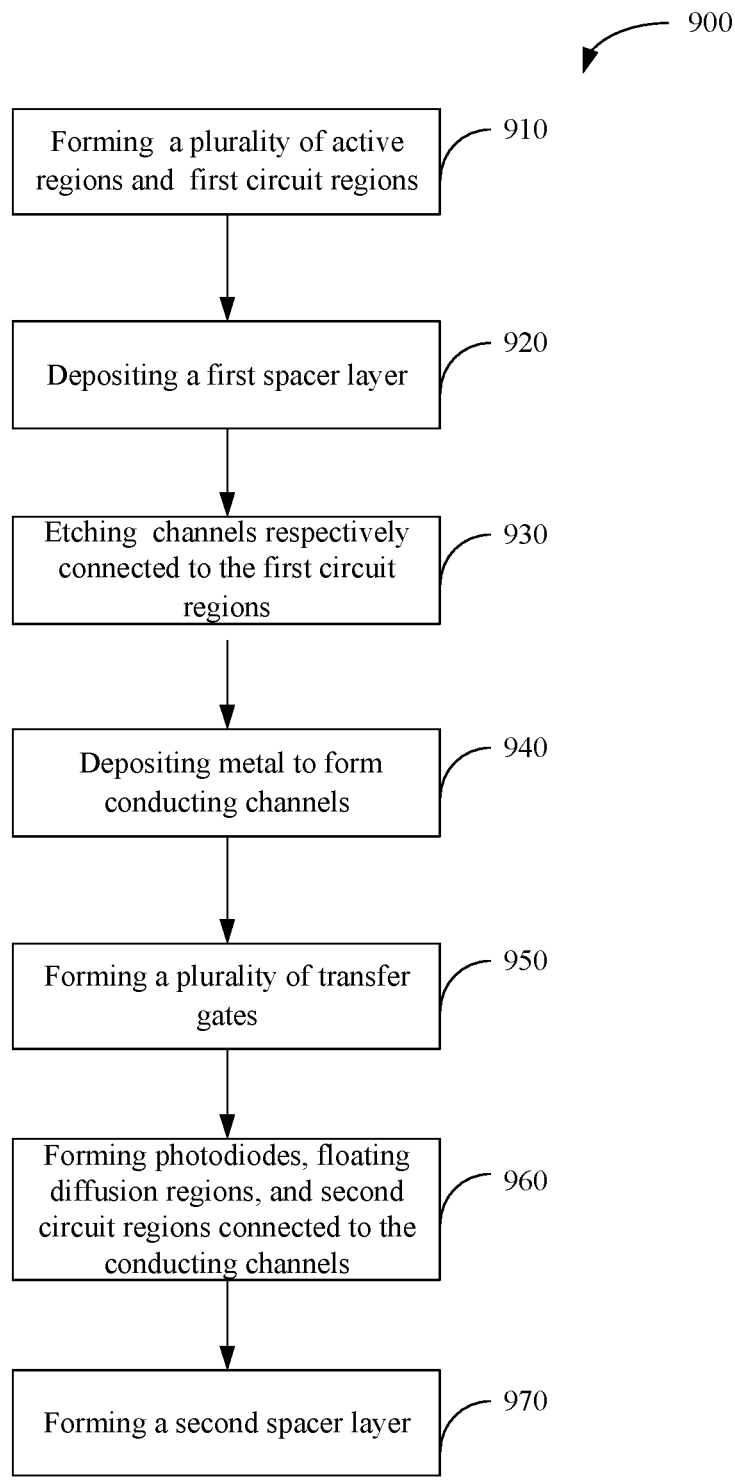
FIG. 9 is a subpixel manufacturing diagram according to one embodiment of the present disclosure.

FIG. 9 is a subpixel manufacturing diagram according to one embodiment of the present disclosure. As illustrated in FIG. 9, a pixel manufacture method 900 comprises: step 910, planting P-type or N-type particle in a substrate to form multiple active regions and to form multiple first circuit regions with respect to each active region; step 920, depositing a first spacer layer; step 930, etching multiple channels in the spacer layer, which are respectively connected to the multiple first circuit regions; step 940, depositing metal in the channels to form multiple conducting channels; step 950, forming multiple transfer gates on a first spacer layer; step 960, forming, on the spacer layer, multiple photodiodes and multiple floating diffusion regions, which are respectively connected to the multiple transfer gates, and multiple second circuit regions, wherein the second circuit regions are connected to the multiple conducting channels; and step 970, forming a second spacer layer on the multiple transfer gates, the multiple photodiodes, and the multiple floating diffusion regions.

The first circuit region comprises switches S1 and S2, capacitors $C_{sig}$ and $C_{rst}$, and an output source following gate and a row selection gate. The second circuit region comprises a reset gate and a source following gate, and optionally, an output gate.

Figure 10:
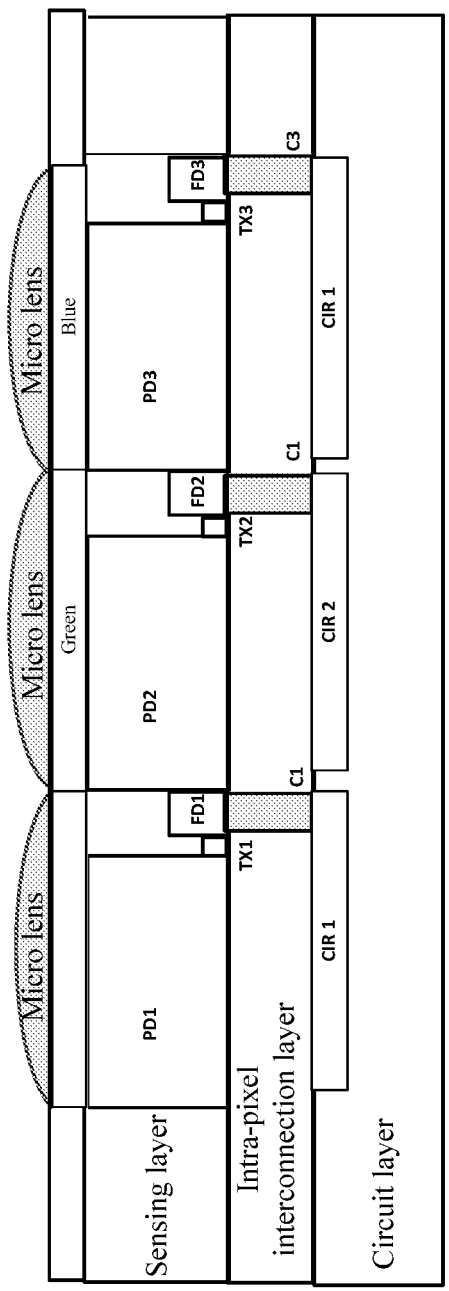
FIG. 10 illustrates a pixel structure schematic diagram according to another embodiment of the present disclosure.

FIG. 10 illustrates a pixel structure schematic diagram according to another embodiment of the present disclosure. As illustrated in FIG. 10 and referring to FIG. 3, under a three-color micro lens, a subpixel comprises a sensing layer, an intra-pixel interconnection layer, and a circuit layer. The sensing layer comprises: a photodiode region PD1 for detecting red light, a transfer gate TX1 connected to PD1, and a floating diffusion region FD1 connected to TX1, a photodiode region PD2 for detecting green light, a transfer gate TX2 connected to PD2, and a floating diffusion region FD2 connected to TX2, and a photodiode region PD3 for detecting blue light, a transfer gate TX3 connected to PD3, and a floating diffusion region FD3 connected to TX3. The intra-pixel interconnection layer comprises three electrically connected channels, i.e., channels C1, C2, and C3, illustrated in the gray part of this figure and electrically connected to FD1, FD2, and FD3 respectively. With respect to each photodiode, the circuit layer comprises corresponding circuit regions CIR1, CIR2, and CIR3. The circuit regions CIR1, CIR2, and CIR3 respectively comprise a reset gate, a source following gate, switches S1 and S2, capacitors $C_{sig}$ and $C_{rst}$, an output source following gate and a row selection gate, optionally, comprises an output gate to form an output transistor.

Figure 11:
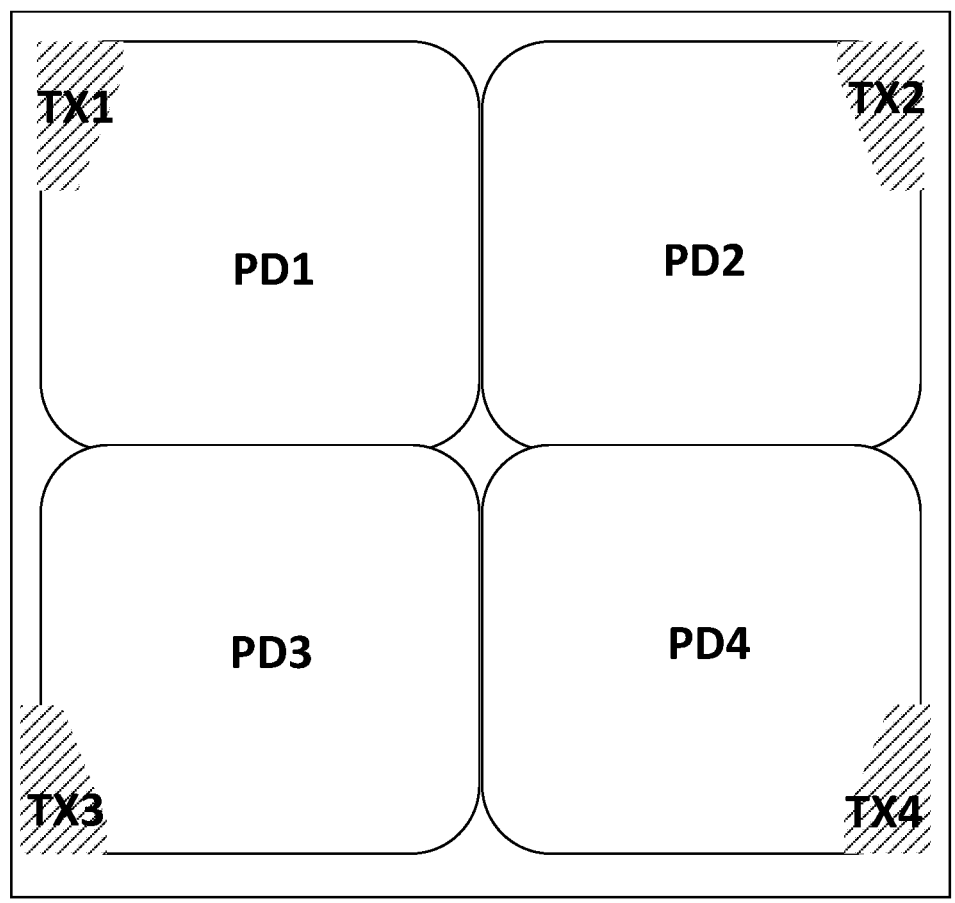
FIG. 11 is a top view of the pixel schematic diagram illustrated in the embodiment of FIG. 10.

FIG. 11 is a top view of the pixel schematic diagram illustrated in the embodiment of FIG. 10. As illustrated in FIG. 11, because the number of reset gates, source following gates and output gate is removed in the photosensitive chip, the area of a photodiode can be further increased, so as to improve the photosensitive capability.

Figure 12:
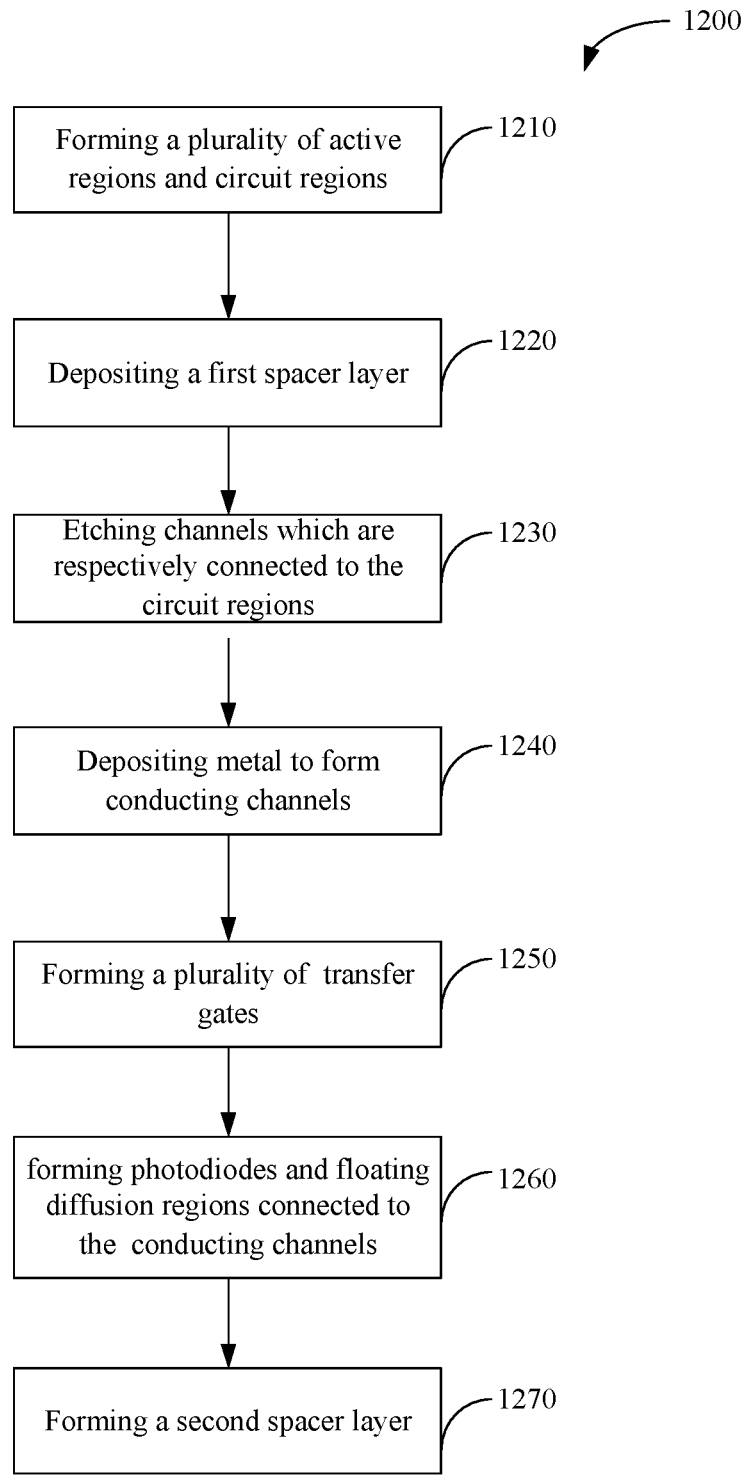
FIG. 12 is a pixel manufacturing diagram according to one embodiment of the present disclosure.

FIG. 12 is a diagram of a method of pixel manufacturing according to one embodiment of the present disclosure. As illustrated in FIG. 12, a pixel manufacture method 1200 comprises: step 1210, planting P-type or N-type particle in a substrate to form multiple active regions and to form multiple circuit regions with respect to each active region; step 1220, depositing a first spacer layer; step 1230, etching multiple channels in the spacer layer, which are respectively connected to the multiple circuit regions; step 1240, depositing metal in the channels to form multiple conducting channels; step 1250, forming multiple transfer gates on a first spacer layer; step 1260, forming, on the spacer layer, multiple photodiodes and multiple floating diffusion regions, which are respectively connected to the multiple transfer gates, wherein the multiple floating diffusion regions are connected to the multiple conducting channels; and step 1270, forming a second spacer layer on the multiple transfer gates, the multiple photodiodes, and the multiple floating diffusion regions. The circuit region comprises a reset gate, a source following gates, switches S1 and S2, capacitors $C_{sig}$ and $C_{rst}$, an output source following gate and a row selection gate, and optionally, an output gate.

Different from the embodiments in FIG. 4 and FIG. 7, in the embodiment of FIG. 10, the 4T CMOS pixel structure is changed from a planar structure to a stereoscopically piled structure. Because reset gates, source following gates and output gates are moved to the logic chip, the element number is further reduced in the pixel of the present disclosure and a bigger photosensitive area can be obtained, so as to improve the photosensitive capability of an imaging device. Furthermore, such change will not make the manufacture procedure to be more complex.

Figure 13:
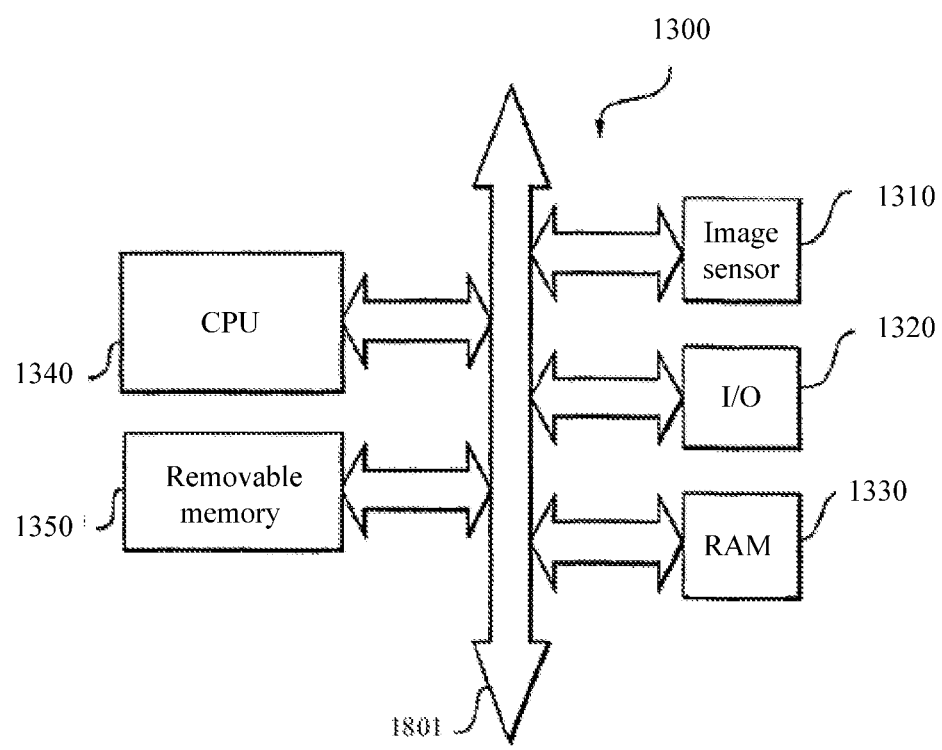
FIG. 13 illustrates a system schematic diagram according to one embodiment of the present disclosure.

FIG. 13 illustrates a system schematic diagram according to one embodiment of the present disclosure. FIG. 13 shows a processor system 1300 comprising an image sensor 1310. The image sensor 1310 is the same as the image sensor described in the present disclosure. The processor system 1300 demonstrates a digital circuit system comprising an image sensor. Without limiting, the system may comprise a computer system, a camera system, a scanner, a machine vision, a vehicle navigation, a video telephone, a monitoring system, an auto focus system, a star tracker system, a motion detection system, an image stabilization system, and a data compression system.

The processor system 1300 (such as a camera system) usually comprises a central processing unit (CPU) 1340 (such as a microprocessor), which communicates with an input/output device 1320 through a bus 1301. The image sensor 1310 also communicates with the CPU 1340 through the bus 1301. The processor based system 1300 also comprises a random access memory (RAM) 1330, and may comprise a removable memory 1350 (e.g., a flash memory), which also communicates with the CPU 1340 through the bus 1301. The image sensor 1310 can be combined into a processor (e.g., CPU, a digital signal processor or a microprocessor). A signal integrated circuit or a chip different from the processor may have or may not have a memory device. The calculation of image combination and processing can be implemented by the image sensor 1310 or CPU 1340.

The foregoing embodiments are merely used for the explanation purposes and are not to be constructed as limiting the present disclosure. Without departing from the scope of the present disclosure, those skilled in the art can make various modifications or variations. Therefore, all equivalent technical solutions also belong to the scope of the present disclosure.

What is claimed is:

1. An imaging device, comprising:
a pixel array, which comprises a plurality of pixels arranged in rows and columns; and
a control circuit, which controls the pixel array;
wherein at least one pixel comprises a plurality of subpixels, each of the plurality of subpixels comprises a photosensitive device and a transfer transistor, each transfer transistor of the plurality of subpixels is controlled by an independent signal, output terminals of the transfer transistors for all of the plurality of subpixels are coupled to a floating diffusion region, a gate of a source following transistor and a drain of a reset transistor are both coupled to the floating diffusion region, the gate of the reset transistor is coupled to an reset control signal line, an independent reset control signal controlling the reset transistor resets the floating diffusion region, the source of the source following transistor and the drain of an output transistor are coupled at a node, and the gate of an output source following transistor is coupled to the node through a first switch and a second switch which are connected in series, one terminal of a first capacitor is coupled to a circuit line that connecting the first switch and the second switch in series, and another terminal of the first capacitor is grounded, one terminal of a second capacitor is coupled to a circuit line that connecting the source of the second switch and the gate of the follower transistor, and the another terminal of the second capacitor is grounded, the source of the output transistor is connected to an input terminal of a single-pole double-throw switch, when a first output terminal and a second output terminal of the single-pole double-throw switch are turned on, the first output terminal and the second output terminal are respectively connected to a column output line and ground, the gate of the output transistor is coupled to an bias signal line, the drain of the output source following transistor is coupled to the source of a row selection transistor, and the drain of the row selection transistor is connected to the column output line, the gate of the row selection transistor is coupled to an row control signal line;
wherein the control circuit reads the plurality of subpixels by turns under a rolling shutter state and reads the plurality of subpixels simultaneously under a global shutter state.

2. The imaging device of claim 1, wherein the bias signal functions as a selection signal under the rolling shutter state and the bias signal controls the off and on states of the output transistor under the global shutter state.

3. The imaging device of claim 1, wherein each of the plurality of subpixels further comprises a sensing layer, an intra-pixel interconnection layer, and a circuit layer.

4. The imaging device of claim 3, wherein the sensing layer comprises:
a photodiode region comprising a plurality of photodiodes; and a transfer gate connected to the photodiode region; and
wherein the floating diffusion region is connected to the transfer gate.

5. The imaging device of claim 3, wherein the circuit layer comprises
a reset gate;
a source following gate;
a row selection gate;
a first capacitor; and
a second capacitor;
wherein the floating diffusion region is electrically connected to the reset gate and the source following gate by an electrical channel of the intra-pixel interconnection layer.

6. An imaging device comprising:
a sensing layer comprising a plurality of units, each of the plurality of units comprises a photodiodes and a transfer transistor, each transfer transistor of the plurality of units is controlled by an independent signal, output terminals of the transfer transistors for all of the plurality of subpixels are coupled to a floating diffusion region, a gate of a source follower transistor and a drain of the reset transistor are both coupled to the floating diffusion region, the gate of the reset transistor is coupled to an reset control signal line, an independent reset control signal controlling the reset transistor resets the floating diffusion region, the source of the source follower transistor and the drain of an output transistor are coupled at a node, the source of the output transistor is connected to an input terminal of a single-pole double-throw switch, when a first output terminal and a second output terminal of a single-pole double-throw switch are turned on, the first output terminal and the second output terminal are respectively connected to a column output line and ground, the gate of the output transistor is coupled to an bias signal line;
an intra-pixel interconnection layer under a sensing chip, and
an electrical connection connecting the sensing chip and a logic chip; and
wherein the logic chip comprises an output source following transistor, a first switch, a second switch and a row selection transistor, the gate of the output source following transistor is coupled to the node through the first switch and the second switch which are connected in series, one terminal of the first capacitor is coupled to the circuit line that connecting the first switch and the second switch in series, and the another terminal of the first capacitor is grounded, one terminal of the second capacitor is coupled to the circuit line that connecting the source of the second switch and the gate of the follower transistor, and the another terminal of the second capacitor is grounded, the drain of the output source following transistor is coupled to the source of the row selection transistor, and the drain of the row selection transistor is connected to the column output line, the gate of the row selection transistor is coupled to an row control signal line,
wherein the plurality of photodiodes are read one by one under a rolling shutter state, and the plurality of photodiodes are read simultaneously under a global shutter state.

7. The imaging device of claim 6, wherein the output transistor is controlled by a bias signal, wherein the bias signal functions as a selection signal under the rolling shutter state, and under the global shutter state, the bias signal controls an off-and-on state of the output transistor.

* * * * *